United States Patent
Sekiya et al.

(10) Patent No.: US 9,937,521 B2
(45) Date of Patent: Apr. 10, 2018

(54) METHOD FOR SPRAYING CHEMICAL SOLUTION

(71) Applicant: MAINTECH CO., LTD., Tokyo (JP)

(72) Inventors: Hiroshi Sekiya, Tokyo (JP); Daisuke Kobayashi, Tokyo (JP); Hideaki Mori, Fuji (JP); Hiraku Sawada, Fuji (JP); Tomohiko Nagatsuka, Fuji (JP)

(73) Assignee: MAINTECH CO., LTD., Tokyo (JP)

( * ) Notice: Subject to any disclaimer, the term of this patent is extended or adjusted under 35 U.S.C. 154(b) by 155 days.

(21) Appl. No.: 14/771,920

(22) PCT Filed: Mar. 4, 2014

(86) PCT No.: PCT/JP2014/001195
§ 371 (c)(1),
(2) Date: Sep. 1, 2015

(87) PCT Pub. No.: WO2014/136445
PCT Pub. Date: Sep. 12, 2014

(65) Prior Publication Data
US 2016/0008845 A1    Jan. 14, 2016

(30) Foreign Application Priority Data

Mar. 4, 2013   (JP) ................................. 2013-042240

(51) Int. Cl.
*B05D 1/00*        (2006.01)
*D21F 1/30*        (2006.01)
(Continued)

(52) U.S. Cl.
CPC ............... *B05D 1/002* (2013.01); *B05D 1/02* (2013.01); *B08B 3/041* (2013.01); *C09D 5/16* (2013.01);
(Continued)

(58) Field of Classification Search
None
See application file for complete search history.

(56) References Cited

U.S. PATENT DOCUMENTS

| 5,588,996 | A  | * | 12/1996 | Costello | ............... | H05K 3/0091 |
|---|---|---|---|---|---|---|
| | | | | | | 118/300 |
| 2006/0086827 | A1 | * | 4/2006 | Sekiya | ...................... | B05B 7/08 |
| | | | | | | 239/433 |
| 2006/0157214 | A1 | * | 7/2006 | Sekiya | ...................... | D21F 1/30 |
| | | | | | | 162/199 |

FOREIGN PATENT DOCUMENTS

| JP | 2000-96478 A | 4/2000 |
|---|---|---|
| JP | 2000-96479 A | 4/2000 |
| (Continued) | | |

OTHER PUBLICATIONS

International Search Report of PCT/2014/001195.

*Primary Examiner* — Michael P Rodriguez
(74) *Attorney, Agent, or Firm* — Muncy, Geissler, Olds & Lowe, P.C.

(57) ABSTRACT

[Problem] To provide a method for spraying a chemical solution that makes it possible to uniformly apply a chemical solution onto a moving body and that exhibits excellent spraying efficiency.
[Solution] The present invention is directed to a method for spraying a chemical solution in which, in a dry part D of a paper-making machine, a chemical solution is continuously sprayed onto a moving body that guides wet paper X, while a nozzle device S is reciprocating in directions orthogonal to a moving direction of the moving body with the moving body in motion, wherein: the moving body is a cylindrical dryer roller D1 or an endless canvas K1; and a travel distance H that the nozzle device S moves during a single rotation of the moving body and a width W of a sprayed area (Continued)

that is formed on the moving body by the nozzle device S satisfy the relationship represented by the following expression: $0.5 \leq H/W \leq 20$.

1 Claim, 8 Drawing Sheets

(51) Int. Cl.
  *D21F 5/04*     (2006.01)
  *B05D 1/02*     (2006.01)
  *B08B 3/04*     (2006.01)
  *C09D 5/16*     (2006.01)
  *D21F 5/02*     (2006.01)
  *G05B 15/02*    (2006.01)
  *D21F 1/32*     (2006.01)

(52) U.S. Cl.
  CPC ............. *D21F 1/30* (2013.01); *D21F 1/325* (2013.01); *D21F 5/02* (2013.01); *D21F 5/021* (2013.01); *D21F 5/04* (2013.01); *G05B 15/02* (2013.01)

(56) References Cited

FOREIGN PATENT DOCUMENTS

| JP | 2004-58031 A  | 2/2004  |
| JP | 2004-218186 A | 8/2004  |
| JP | 2005-314814 A | 11/2005 |

* cited by examiner

METHOD FOR SPRAYING CHEMICAL SOLUTION

TECHNICAL FIELD

The present invention relates to methods for spraying a chemical solution and, more particularly, to a method for spraying a chemical solution onto a moving body of a paper-making machine.

BACKGROUND ART

A paper-making machine for manufacturing paper includes a dry part for heating and drying wet paper.

Wet paper fed to the dry part is dried by being pressed against a surface of a dryer roller by a canvas. Note here that moving bodies such as the dryer roller and the canvas are configured to rotate to move at the same speed as the wet paper.

Incidentally, the dry part undesirably allows easy adhesion of paper powder or pitch. Adhesion of paper powder or pitch to the dry part causes the powder or the pitch to be transferred to the wet paper, leading to contamination of the wet paper.

In an attempt to solve this problem, methods for appreciation a dryer roller or canvas of a dry part with an anti-contamination agent by using a movable nozzle device have been developed (e.g. see PTLs 1 to 5).

CITATION LIST

Patent Literature

PTL 1: Japanese Patent Application Laid-Open No. 2000-96478

PTL 2: Japanese Patent Application Laid-Open No. 2000-96479

PTL 3: Japanese Patent Application Laid-Open No. 2004-58031

PTL 4: Japanese Patent Application Laid-Open No. 2004-218186

PTL 5: Japanese Patent Application Laid-Open No. 2005-314814

SUMMARY OF INVENTION

Technical Problem

However, the anti-contamination methods described in PTLs 1 to 5 cannot necessarily prevent adhesion of paper powder or pitch. That is, the anti-contamination methods described in PTLs 1 to 5 cannot be said to be excellent in efficiency of spraying of the anti-contamination agent.

Specifically, even if the dryer roller or the canvas is coated with the anti-contamination agent by using the movable nozzle device, it is difficult to uniformly apply the anti-contamination agent, as the dryer roller and the canvas are moving at the same speed as the wet paper.

The present invention has been made in view of these circumstances, and it is an object of the present invention to provide a method for spraying a chemical solution that makes it possible to apply a chemical solution onto a moving body as uniformly as possible and that exhibits excellent spraying efficiency.

Solution to Problems

The inventors of the present invention diligently studied in order to solve the problems described above. As a result, the inventors found, surprisingly, that the problems can be solved by establishing a predetermined relationship between a travel distance H that a nozzle device travels during a single rotation of a moving body and a width W of a sprayed area that is formed on the moving body by the nozzle device. Thus, the inventors finally accomplished the present invention.

A first aspect of the present invention is directed to a method for spraying a chemical solution in which, in a dry part of a paper-making machine, a chemical solution is continuously sprayed onto a moving body that guides wet paper, while a nozzle device is reciprocating in directions orthogonal to a moving direction of the moving body with the moving body in motion, wherein: the moving body is a cylindrical dryer roller or an endless canvas; and a travel distance H that the nozzle device moves during a single rotation of the moving body and a width W of a sprayed area that is formed on the moving body by the nozzle device satisfy the relationship represented by the following expression: $0.5 \leq H/W \leq 20$.

A second aspect of the present invention is directed to a method for spraying a chemical solution in which, in a dry part of a paper-making machine, a chemical solution is continuously sprayed onto a moving body that guides wet paper, while a nozzle device is reciprocating in directions orthogonal to a moving direction of the moving body with the moving body in motion, wherein: the moving body is an endless canvas; and a travel distance H that the nozzle device moves during a single rotation of the moving body and a width W of a sprayed area that is formed on the moving body by the nozzle device satisfy the relationship represented by the following expression: $0.5 \leq H/W \leq 12$.

A third aspect of the present invention is directed to a method for spraying a chemical solution in which, in a dry part of a paper-making machine, a chemical solution is continuously sprayed onto a moving body that guides wet paper, while a nozzle device is reciprocating in directions orthogonal to a moving direction of the moving body with the moving body in motion, wherein: the moving body is an endless canvas that is guided by a canvas outer roller; and a travel distance H that the nozzle device moves during a single rotation of the moving body and a width W of a sprayed area that is formed on the moving body by the nozzle device satisfy the relationship represented by the following expression: $1 \leq H/W \leq 12$.

A fourth aspect of the present invention is directed to the method according to any one of the first to third aspects, wherein: the width W of the sprayed area that is formed by the nozzle device falls within a range of 30 to 150 mm; and the travel distance H that the nozzle device moves falls within a range of 15 to 1800 mm.

A fifth aspect of the present invention is directed to a method for spraying a chemical solution in which, in a dry part of a paper-making machine, a chemical solution is continuously sprayed onto a moving body that guides wet paper, while a nozzle device is reciprocating in directions orthogonal to a moving direction of the moving body with the moving body in motion, wherein: the moving body is a cylindrical dryer roller; and a travel distance H that the nozzle device moves during a single rotation of the moving body and a width W of a sprayed area that is formed on the moving body by the nozzle device satisfy the relationship represented by the following expression: $0.5 \leq H/W \leq 3$.

A sixth aspect of the present invention is directed to the method according to the fifth aspect, wherein a full width A1 of the wet paper that is guided by the moving body and the travel distance H that the nozzle device moves during a single rotation of the moving body satisfy the relationship represented by the following expression: A1/H≤300.

A seventh aspect of the present invention is directed to the method according to the fifth or sixth aspect, wherein: the width W of the sprayed area that is formed by the nozzle device falls within a range of 30 to 150 mm; and the travel distance H that the nozzle device moves falls within a range of 15 to 450 mm.

An eighth aspect of the present invention is directed to a control method for controlling the method according to any one of the first to seventh aspects, including: inputting a speed of the wet paper to a computer; setting driving information for the nozzle device by causing the computer to perform a computation to satisfy the relationship represented by the expression; causing a sequencer to receive the driving information from the computer; causing the sequencer to transmit time information and speed information based on the driving information; and controlling a travel speed and an inversion time of the nozzle device.

A ninth aspect of the present invention is directed to a chemical solution for use in the method according to any one of the first to eighth aspects, wherein the chemical solution has a viscosity of 500 cps or lower.

Advantageous Effects of Invention

The method for spraying a chemical solution of the present invention is configured such that the moving body is a cylindrical dryer roller or an endless canvas and that when the chemical solution is continuously sprayed onto the moving body while the nozzle device is reciprocating in the directions orthogonal to the moving direction of the moving body with the moving body in motion, the travel distance H that the nozzle device moves during a single rotation of the moving body and the width W of the sprayed area that is formed on the moving body by the nozzle device satisfy the relationship 0.5≤H/W≤20. This makes it possible to apply the chemical solution onto the moving body without leaving a gap between sprayed areas, thus making it possible to surely form a uniform membrane. As a result, the occurrence of a partial cut in the membrane can also be prevented.

Further, for this reason, the transfer of paper powder or pitch to the wet paper can be prevented.

In particular, by satisfying the relationship 0.5≤H/W≤12 in a case where the moving body is an endless canvas or satisfying the relationship 1≤H/W≤12 in a case where the moving body is an endless canvas that is guided by a canvas outer roller, a more uniform membrane can be formed, and the occurrence of a partial cut in the membrane can be prevented.

Note here that in a case where the travel distance H that the nozzle device moves falls within a range of 15 to 1800 mm and the width W of the sprayed area falls within a range of 30 to 150 mm, it becomes possible to efficiently spray the chemical solution onto the canvas without causing uneven spraying.

Further, by satisfying the relationship 0.5≤H/W≤3 in a case where the moving body is a cylindrical dryer roller, a more uniform membrane can be formed, and the occurrence of a partial cut in the membrane can be prevented.

Note here that in a case where the travel distance H that the nozzle device moves falls within a range of 15 to 450 mm and the width W of the sprayed area falls within a range of 30 to 150 mm, it becomes possible to efficiently spray the chemical solution onto the canvas without causing uneven spraying.

Further, in a case where the full width A1 of the wet paper that is guided by the moving body and the travel distance H that the nozzle device moves during a single rotation of the moving body satisfy the relationship represented by the following expression A1/H≤300, it becomes possible to more efficiently spray the chemical solution onto the dryer roller.

The control method of the present invention includes: inputting a speed of the wet paper to a computer; setting driving information for the nozzle device by causing the computer to perform a computation to satisfy the relationship represented by the expression: causing a sequencer to receive the driving information from the computer; causing the sequencer to transmit time information and speed information based on the driving information; and controlling a travel speed and an inversion time of the nozzle device. This makes it possible to efficiently spray a chemical solution according to a change in paper-making speed.

With a viscosity of 500 cps or lower, the chemical solution of the present invention can be evenly and uniformly applied.

DESCRIPTION OF EMBODIMENTS

Figure 1:
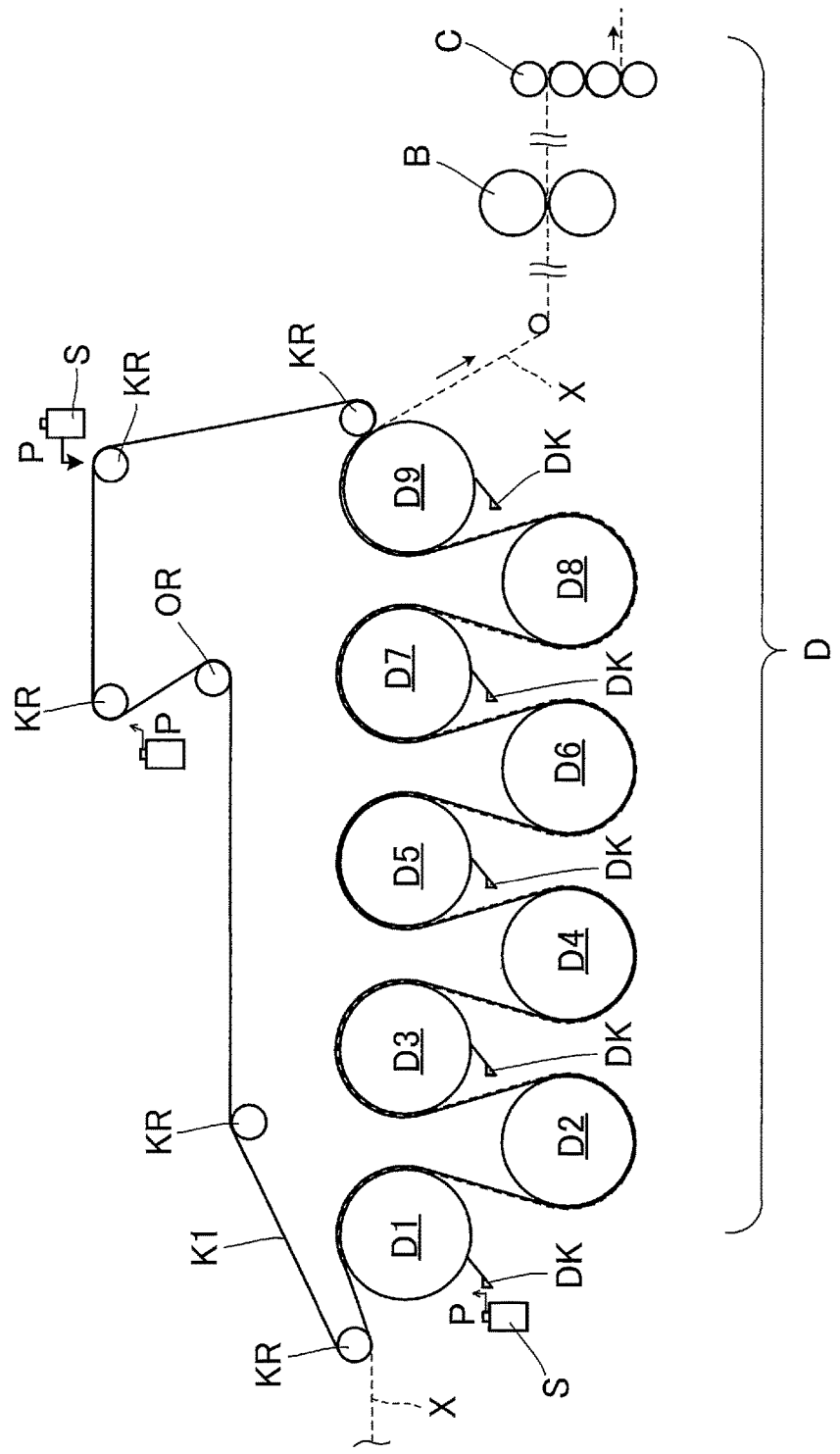
FIG. 1 is a schematic view showing a dry part of a paper-making machine in which a method for spraying a chemical solution according to a first embodiment is used.

Preferred embodiments of the present invention are described in detail below with reference to the drawings as needed. In the drawings, the same components are given the same reference signs, and repetition of the same descriptions is omitted. Further, unless otherwise noted, positional relationships such as top and bottom, left and right are based on those shown in the drawings. Furthermore, the dimensional ratios of the drawings are not limited to those shown in the drawings.

First Embodiment

FIG. 1 is a schematic view showing a dry part of a paper-making machine in which a method for spraying a chemical solution according to a first embodiment is used.

As shown in FIG. 1, a dry part D of a paper-making machine includes: wet paper X; a plurality of cylindrical dryer rollers (Yankee dryers) D1, D2, D3, D4, D5, D6, D7, D8, and D9 (hereinafter referred to as "D1 to D9") configured to move while heating and drying the wet paper X; doctors DK configured to be in contact with the dryer rollers D1, D3, D5, D7 and D9; a canvas K1 configured to move while pressing the wet paper X against surfaces of the dryer rollers D1 to D9: canvas rollers KR configured to guide the canvas K1; an outer roller OR configured to guide the canvas K1; breaker stack rollers B configured to move while temporarily pressing the wet paper X heated and dried by the dryer rollers D1 to D9; and calender rollers C configured to move while pressing the wet paper X temporarily pressed by the breaker stack rollers B. That is, the dry part D includes moving bodies composed of the dryer rollers D1 to D9, the canvas K1, the breaker stack rollers B, and the calender rollers C.

In the dry part D, the wet paper X fed to the dry part is pressed by the canvas K1 into contact with the surfaces of the dryer rollers D1 to D9 that are rotating. This causes the wet paper X to adhere to the dryer rollers D1 to D9 to be heated and dried and to be guided by the dryer rollers D1 to D9 that are rotating and the canvas K1 that is moving.

After that, the wet paper X has its smoothness and paper thickness gently adjusted by the breaker stack rollers B. Then, the wet paper X has its smoothness and paper thickness again adjusted by the calender rollers C. Thus, the wet paper X is made denser to give paper.

Note here that the moving bodies, namely the dryer rollers D1 to D9, the canvas K1, the breaker stack rollers B, and the calender rollers C, move (rotate) at the same speed as the wet paper X.

In the dry part D, chemical solutions are sprayed onto the dryer roller D1 and the canvas K1 by nozzle devices S in positions indicated by the arrows P in FIG. 1, respectively.

Further, in the dry part D, the doctors DK are in contact with the dryer rollers D1, D3, D5, D7, and D9. This allows the dryer rollers D1, D3, D5, D7, and D9 to move so that paper powder or pitch having adhered can be scraped away by the doctors DK.

Furthermore, in the dry part D, the canvas K1 is guided by the canvas rollers KR and the outer roller OR.

Note here that since the canvas K1 is guided by the outer roller OR as well as the canvas rollers KR, there are advantages of a simple mechanical structure for adjusting canvas tension and easy maintenance.

Next, a method for continuously spraying a chemical solution onto the dryer roller D1 is described.

Figure 2:
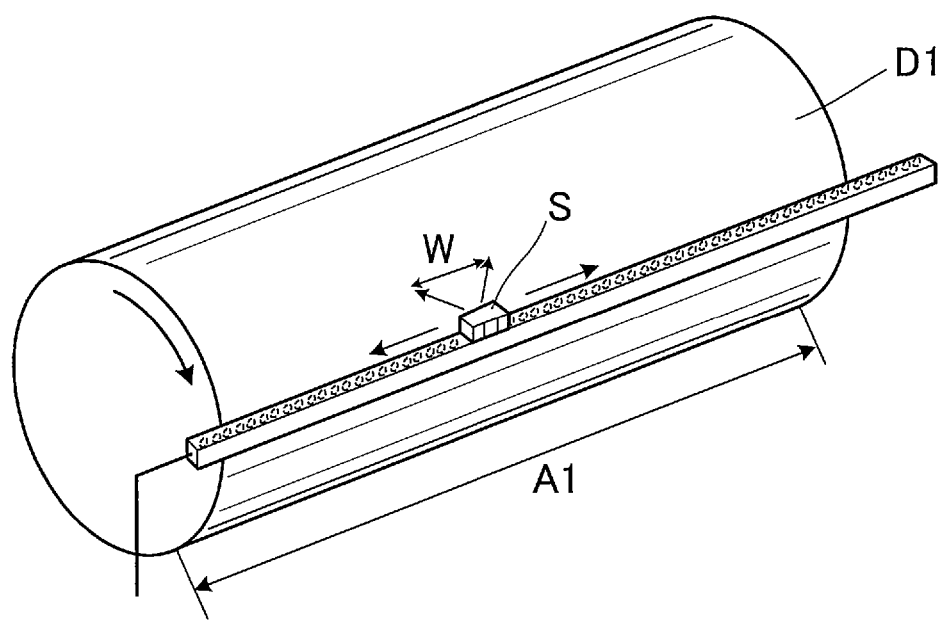
FIG. 2 is a perspective view schematically showing a state in which a chemical solution is being sprayed onto a dryer roller by the method according to the first embodiment.

FIG. 2 is a perspective view schematically showing a state in which a chemical solution is being sprayed onto a dryer roller by the method according to the first embodiment.

In the method for spraying a chemical solution, as shown in FIG. 2, a chemical solution is sprayed onto the dryer roller D1 by using a nozzle device S.

Note here that the dryer roller D1 is configured to rotate (move) in a moving direction of wet paper (not shown) together with the wet paper.

Meanwhile, the nozzle device S is configured to reciprocate in directions orthogonal to a moving direction of the dryer roller D1.

Moreover, the chemical solution is sprayed from the nozzle device S to the dryer roller D1 while the nozzle device S is reciprocating with the dryer roller D1 in motion.

Figure 3A:
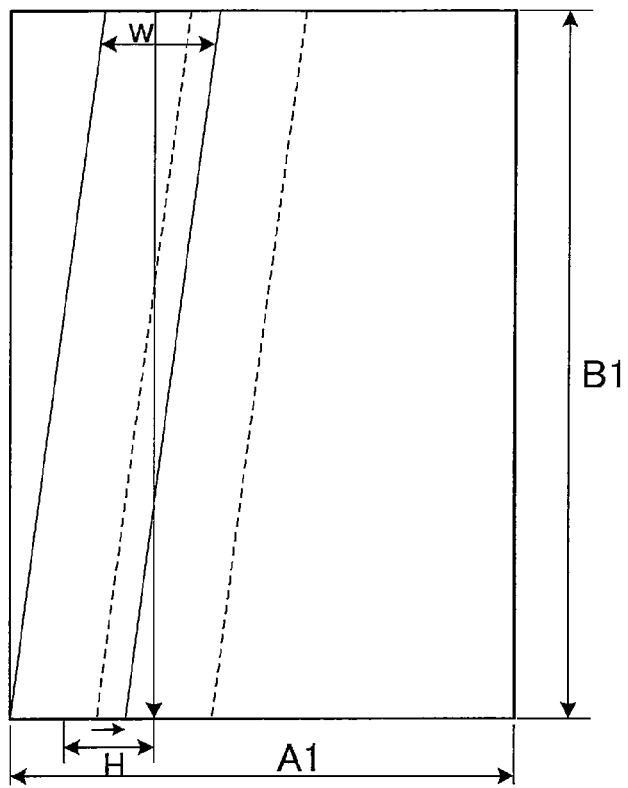
FIG. 3(a) and FIG. 3(b) are a development equivalent to a single rotation of the dryer roller, for describing a place on the dryer roller onto which the chemical solution has been sprayed by the method according to the first embodiment.
Figure 3B:
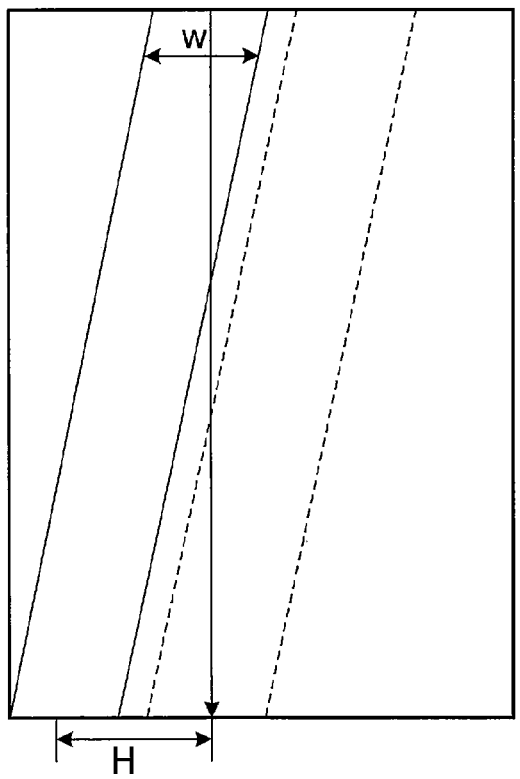

FIGS. 3(a) and 3(b) are each a development equivalent to a single rotation of the dryer roller, for describing a place on the dryer roller onto which the chemical solution has been sprayed by the method according to the first embodiment.

As mentioned above, during a single rotation of the dryer roller D1, the nozzle device S continuously sprays the chemical solution while traveling in the directions orthogonal to the moving direction of the dryer roller D1. Therefore, as shown in FIGS. 3(a) and 3(b), the chemical solution is applied to form a sprayed area having a parallelogram shape.

Note here that a travel distance H that the nozzle device S travels during a single rotation of the dryer roller D1 and a width W of a sprayed area formed on the dryer roller D1 by the nozzle device S satisfy the relationship represented by the following expression:

$$0.5 \leq H/W \leq 20.$$

The term "width W of a sprayed area" as used herein means a maximum width of the chemical solution, sprayed from the nozzle device S onto the dryer roller D1 and having adhered to the dryer roller D1, in a width direction of the dryer roller D1.

Continuous spraying of the chemical solution makes it possible, in a range of $0.5 \leq H/W \leq 1$, to apply the chemical solution onto the dryer roller D1 (moving body) without leaving a gap between sprayed areas as shown in FIG. 3(a) and, in a range of $1 \leq H/W \leq 20$, forms a gap as shown in FIG. 3(b) but can make the gap as small as possible. In this case, the wet paper that is guided by the dryer roller D1 and the doctor DK that is in contact with the dryer roller D1 can fill the gap by uniforming the applied chemical solution as the dryer roller D1 moves, thus making it possible to efficiently form a uniform membrane on the dryer roller D1.

As a result, the occurrence of a partial cut in the membrane can also be prevented. This makes it possible to surely prevent adhesion of paper powder or pitch. For this reason, the transfer of paper powder or pitch to the wet paper can be prevented.

If H/W in the above expression is less than 0.5, the speed is slower than in a case where H/W falls within the above range. This reduces the efficiency of application of the chemical solution and causes too much overlapping application of the chemical solution, thus making it easy for uneven coating to occur.

On the other hand, if H/W exceeds 20, a gap between areas onto which the chemical solution has been sprayed is too large, thus causing a partial cut in the membrane, as mentioned above.

Further, in this range, it is preferable that the relationship $0.5 \leq H/W \leq 12$ be satisfied, more preferable that the relationship $0.5 \leq H/W \leq 3$ be satisfied, and even more preferable that the relationship $0.5 \leq H/W \leq 2$ be satisfied. In this case, the efficiency of application of the chemical solution is excellent. This makes it possible to form a more uniform membrane and surely prevent the occurrence of a partial cut in the membrane.

Note here that it is preferable that the width W of the sprayed area formed by the nozzle device fall within a range of 30 to 150 mm.

If the width W of the sprayed area is smaller than 30 mm, there are drawbacks of taking a longer time for the nozzle to reciprocate for reapplication and making the number of contacts with the wet paper larger than in a case where the width W of the sprayed area falls within the above range. On the other hand, if the width W of the sprayed area is larger than 150 mm, there is a drawback of making the efficiency of adhesion to the target lower due to scattering of a low-impact spray width end than in a case where the width W of the sprayed area falls within the above range.

Further, it is preferable that the travel distance H that the nozzle device travels fall within a range of 15 to 450 mm, more preferably within a range of 15 to 300 mm.

If the travel distance H is shorter than 15 mm, there are drawbacks of taking a longer time for the nozzle to reciprocate for reapplication and making the number of contacts with the wet paper larger than in a case where the travel distance H falls within the above range. On the other hand, if the travel distance H is longer than 450 mm, there is a drawback of making the efficiency of adhesion to the target lower due to scattering of a low-impact spray width end than in a case where the travel distance H falls within the above range.

Furthermore, it is preferable that a full width A1 of the wet paper that is guided by the dryer roller D1 and the travel distance H that the nozzle device travels during a single rotation of the dryer roller D satisfy the relationship represented by the following expression:

$$A1/H \leq 300.$$

In this case, it becomes possible to more efficiently spray the chemical solution onto the dryer roller.

If A1/H exceeds 300, the chemical solution cannot be efficiently sprayed and there is an increase in soiling as compared with a case where A1/H falls within the above range.

Note here that the full width A1 of the wet paper that is guided by the dryer roller D1 fall within a range of 3000 to 9000 mm. FIG. 2 shows a case where the full width A1 of the wet paper (i.e. a width of the wet paper in a direction orthogonal to the moving direction of the dryer roller D1) is equal to a full width of the dryer roller D1. That is, in a case where the full width A1 of the wet paper is smaller than the full width of the dryer roller D1, the dryer roller D1 has provided at both ends thereof places onto which no chemical solution is applied.

There is no problem even if the full width A1 is smaller than 3000 mm; however, as compared with a case where the full width A1 falls within the above range, the number of contacts during reciprocation is smaller and it is easier for the applied chemical solution to overaccumulate on the dryer roller, so that there is a drawback of making it necessary to adjust the amount of application. On the other hand, if the full width A1 is larger than 9000 mm, there are drawbacks of taking a longer time for the nozzle to reciprocate for reapplication and making the number of contacts with the wet paper larger to make it easier for a cut in the membrane to occur than in a case where the full width A1 falls within the above range.

Further, it is preferable that a perimeter B1 of the dryer roller D1 fall within a range of 3700 to 6000 mm. The perimeter B1 of the dryer roller D1 means a length of a circumference of the dryer roller D1.

If the perimeter B1 is shorter than 3700 mm, it takes a shorter time for the roller to revolve than in a case where the perimeter B1 falls within the above range, so that there are drawbacks of making the number of contacts with the wet paper larger and making it easier for a cut in the membrane to occur. On the other hand, if the perimeter B1 is longer than 6000 mm, the wet paper is in contact with the dryer roller D1 for a longer time than in a case where the perimeter B1 falls within the above range, so that there is a drawback of causing the membrane to be absorbed into the wet paper to make it easier for a cut in the membrane to occur.

Furthermore, an amount of time it takes for the dryer roller D1 to complete a single rotation fall within a range of 0.19 to 2.0 seconds.

If the amount of time is shorter than 0.19 second, the moisture in the chemical solution evaporates less than in a case where the amount of time falls within the above range, so that there is a drawback of insufficient exertion of the effects. On the other hand, if the amount of time is longer than 2.0 seconds, the wet paper is in contact with the dryer roller D1 for a longer time than in a case where the time falls within the above range, so that there is a drawback of causing the membrane to be absorbed into the wet paper to make it easier for a cut in the membrane to occur.

Next, a method for continuously spraying a chemical solution onto the canvas K1 that is guided by the outer roller OR is described.

FIG. 4 is a perspective view schematically showing a state in which a chemical solution is being sprayed onto a canvas by the method according to the first embodiment.

In the method for spraying a chemical solution, as shown in FIG. 4, a chemical solution is sprayed onto the endless canvas K1 by using a nozzle device S.

Note here that the canvas K1 is configured to move in a moving direction of wet paper (not shown) together with the wet paper.

Meanwhile, the nozzle device S is configured to reciprocate in directions orthogonal to a moving direction of the canvas K1.

Moreover, the chemical solution is sprayed from the nozzle device S to the canvas K1 while the nozzle device S is reciprocating with the canvas K1 in motion.

FIG. 5 is a development equivalent to a single rotation of the canvas, for describing a place on the canvas onto which the chemical solution has been sprayed by the method according to the first embodiment. The term "single rotation of the canvas" as used herein means the duration for which a predetermined position on the canvas makes one cycle to come back to the original position.

As mentioned above, during a single rotation of the canvas K1, the nozzle device S continuously sprays the chemical solution while moving in the directions orthogonal to the moving direction of the canvas K1. Therefore, as shown in FIG. 5, the chemical solution is applied into a parallelogram shape.

Note here that, as in the case of the aforementioned dryer roller D1, a travel distance H that the nozzle device S travels during a single rotation of the canvas K1 and a width W of a sprayed area formed on the canvas K1 by the nozzle device S satisfy the relationship represented by the following expression:

$$0.5 \leq H/W \leq 20.$$

Continuous spraying of the chemical solution makes it possible, in a range of $0.5 \leq H/W \leq 1$, to apply the chemical solution onto the canvas K1 (moving body) without leaving a gap between sprayed areas and, in a range of $1 \leq H/W \leq 20$, forms a gap but can make the gap as small as possible. In this case, the outer roller OR that guides the canvas K1 can fill the gap by uniforming the chemical solution as the canvas K1 moves, thus making it possible to efficiently form a uniform membrane on the canvas K1.

As a result, the occurrence of a partial cut in the membrane can be prevented. This makes it possible to surely prevent adhesion of paper powder or pitch.

Further, in this range, it is preferable that the relationship $1 \leq H/W \leq 12$ be satisfied, more preferable that the relationship $1 \leq H/W \leq 9$ be satisfied, and even more preferable that the relationship $1 \leq H/W \leq 7$ be satisfied. In this case, the efficiency of application of the chemical solution is excellent.

This makes it possible to form a more uniform membrane and surely prevent the occurrence of a partial cut in the membrane.

Further, as in the case of the aforementioned dryer roller D1, it is preferable that the width W of the sprayed area formed by the nozzle device fall within a range of 30 to 150 mm, and it is preferable that the travel distance H that the nozzle device travels fall within a range of 15 to 1800 mm, more preferably within a range of 15 to 1350 mm.

Figure 4:
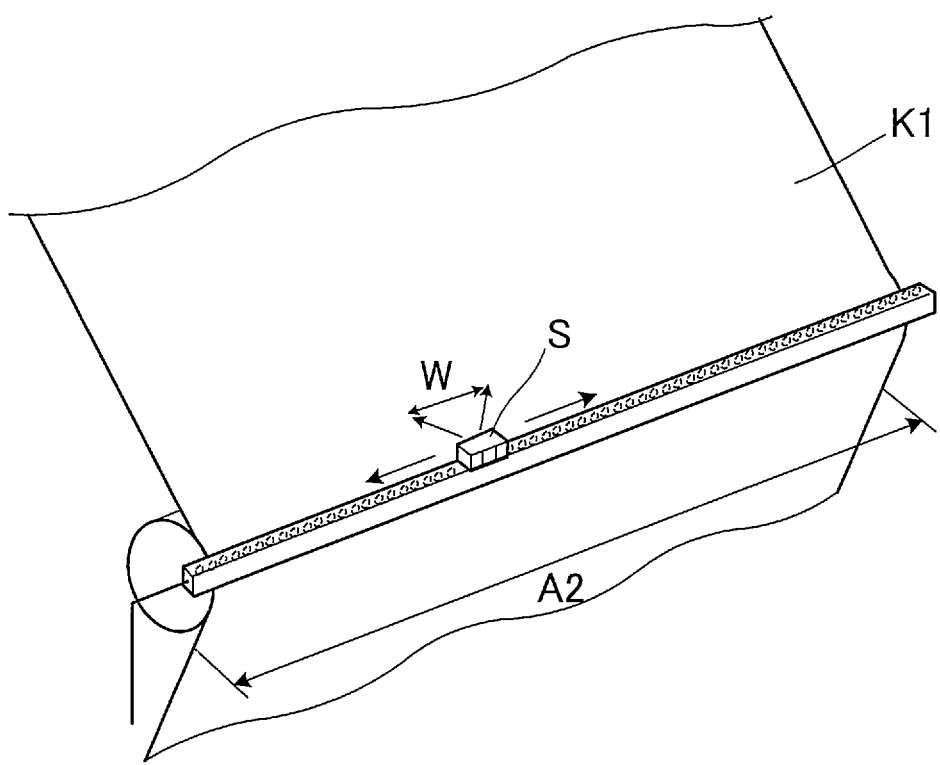
FIG. 4 is a perspective view schematically showing a state in which a chemical solution is being sprayed onto a canvas by the method according to the first embodiment.
Figure 5:
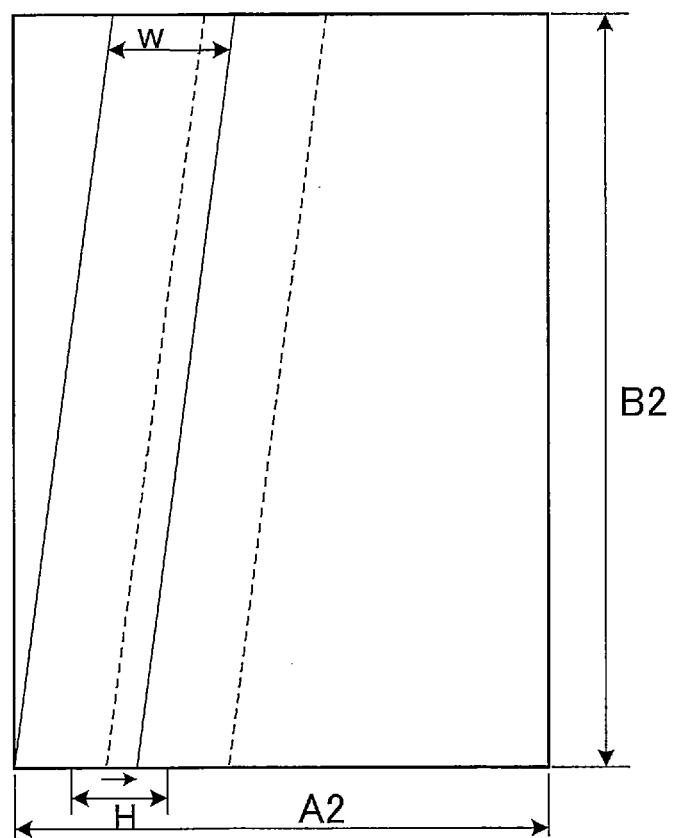
FIG. 5 is a development equivalent to a single rotation of the canvas, for describing a place on the canvas on to which the chemical solution has been sprayed by the method according to the first embodiment.

Note here that a full width A2 of the wet paper that is guided by the canvas K1 fall within a range of 3000 to 9000 mm. FIG. 4 shows a case where the full width A2 of the wet paper (i.e. a width of the wet paper in a direction orthogonal to the moving direction of the canvas K1) is equal to a full width of the canvas K1. That is, in a case where the full width A2 of the wet paper is smaller than the full width of the canvas K1, the canvas K1 has provided at both ends thereof places onto which no chemical solution is applied.

There is no problem even if the full width A2 is smaller than 3000 mm; however, as compared with a case where the full width A2 falls within the above range, the amount of coating on the canvas tends to be excessive, so that there is a drawback of making it necessary to adjust the amount of application. On the other hand, if the full width A2 is larger than 9000 mm, there are drawbacks of taking a longer time for the nozzle to reciprocate for reapplication and making the number of contacts with the wet paper larger to make it easier for a cut in the membrane to occur than in a case where the full width A2 falls within the above range.

Further, it is preferable that a full length B2 of the canvas K1 fall within a range of 25000 to 90000 mm. The full length B2 of the canvas K1 means a full length of the canvas K1 in the moving direction.

If the full length B2 is smaller than 25000 mm, as compared with a case where the full length B2 falls within the above range, the amount of coating on the canvas tends to be excessive, so that there is a drawback of making it necessary to adjust the amount of application. On the other hand, if the full length B2 is larger than 90000 mm, there are drawbacks of taking a longer time for the nozzle to reciprocate for reapplication and making the number of contacts with the wet paper larger to make it easier for a cut in the membrane to occur than in a case where the full length B2 falls within the above range.

Furthermore, an amount of time it takes for the canvas K1 to complete a single rotation fall within a range of 1 to 20 seconds.

If the amount of time is shorter than 1 second, the moisture in the chemical solution evaporates less than in a case where the amount of time falls within the above range, so that there is a drawback of insufficient exertion of the effects. On the other hand, if the amount of time is longer than 20 seconds, the wet paper makes contact with the canvas K1 for a longer time than in a case where the amount of time falls within the above range, so that there is a drawback of causing the membrane to be absorbed into the wet paper to make it easier for a cut in the membrane to occur.

In the method according to the first embodiment, it is preferable that the chemical solution be a water-soluble chemical solution which forms a membrane by being sprayed onto a moving body. In this case, the occurrence of a partial cut in the membrane can be prevented. This enables the chemical solution to surely and sufficiently exert its effects.

Note here that the amount of application of the chemical solution fall within a range of 0.1 to 400 µg/m$^2$ in terms of solid content.

If the amount of application is smaller than 0.1 µg/m$^2$, the chemical solution does not sufficiently adhere to the surface of the moving body, as compared with a case where the amount of application falls within the above range. On the other hand, if the amount of application is larger than 400 µg/m$^2$, an excess of the chemical solution may be absorbed into the wet paper X, as compared with a case where the amount of application falls within the above range.

Examples of the chemical solution include, but are not particularly limited to, an anti-contamination agent, a release agent, a cleaning agent, and the like.

Next, a method for controlling the aforementioned method for spraying a chemical solution is described.

Figure 6:
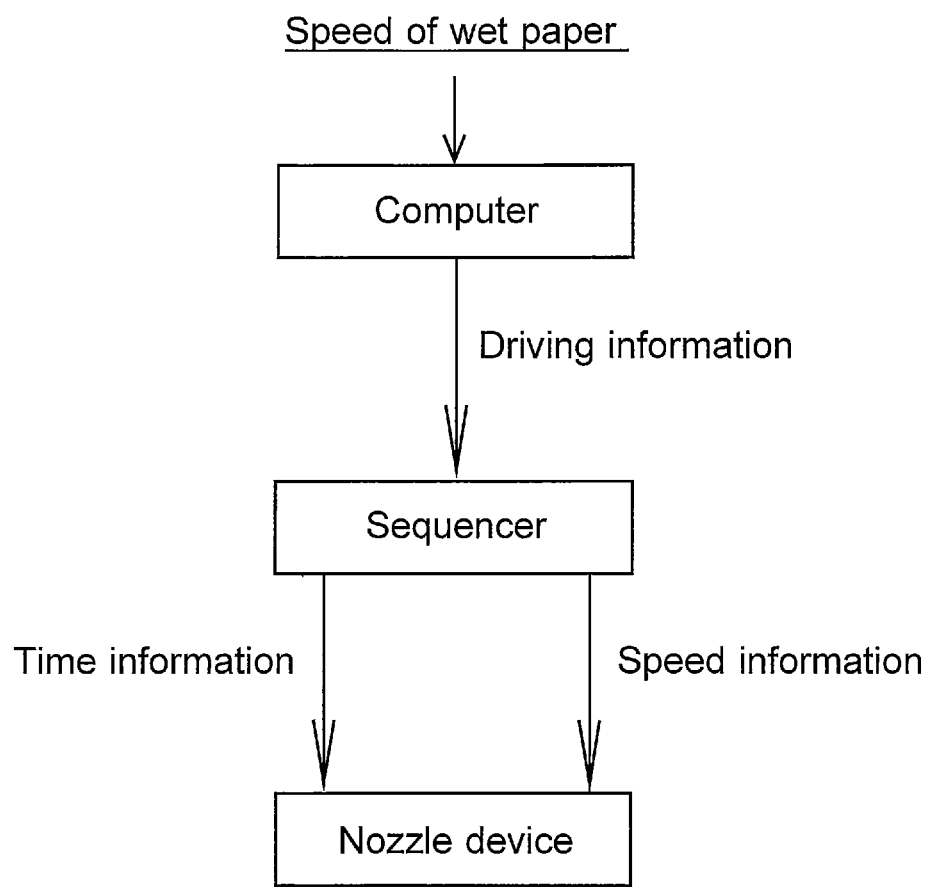
FIG. 6 is a flow chart showing a control method according to the first embodiment.

FIG. 6 is a flow chart showing a control method according to the first embodiment.

In the control method according to the first embodiment, as shown in FIG. 6, first, a speed of the wet paper is inputted to a computer.

Then, the computer computes the travel distance H that the nozzle device S travels during a single rotation of the canvas K1 to satisfy the relationship represented by the aforementioned equation with respect to a preset width W of a sprayed area that is formed by the nozzle device S, thereby setting driving information for the nozzle device.

Next, a sequencer receives the driving information from the computer, and on the basis of the driving information, time information based on timer control and speed information of a motor based on inverter adjustment are transmitted from the sequence to the nozzle device.

Thus, the nozzle device has its travel speed and inversion time controlled. With these, the control method according to the first embodiment makes it possible to efficiently spray a chemical solution according to a change in paper-making speed.

Next, a chemical solution for use in the aforementioned method for spraying a chemical solution is described.

Examples of a main ingredient of the chemical solution according to the present embodiment include a water-soluble polymer, silicone emulsion, wax, and the like.

It is preferable that the chemical solution have a viscosity of 500 cps or lower at normal temperature (25° C.), more preferably 1 to 200 cps.

If the viscosity is higher than 500 cps, the chemical solution may scatter to adhere to a nozzle orifice in a nozzle or a slit in a spraying nozzle, as compared with a case where the viscosity falls within the above range.

Further, since such adhesion disables the chemical solution to be sufficiently discharged or disables the spraying nozzle to fully function, the chemical solution cannot be sufficiently applied onto the moving body and tends to scatter.

It is preferable that a proportion of a remaining component (component to be solidified) contained in the chemical solution be 50% by mass or lower, more preferably within a range of 0.1 to 50% by mass.

In this case, the chemical solution can be prevented from scattering to adhere to a nozzle orifice in a discharging nozzle or the slit in the spraying nozzle so that the remaining component contained in the chemical solution clogs the nozzle orifice or the slit.

Second Embodiment

Figure 7:
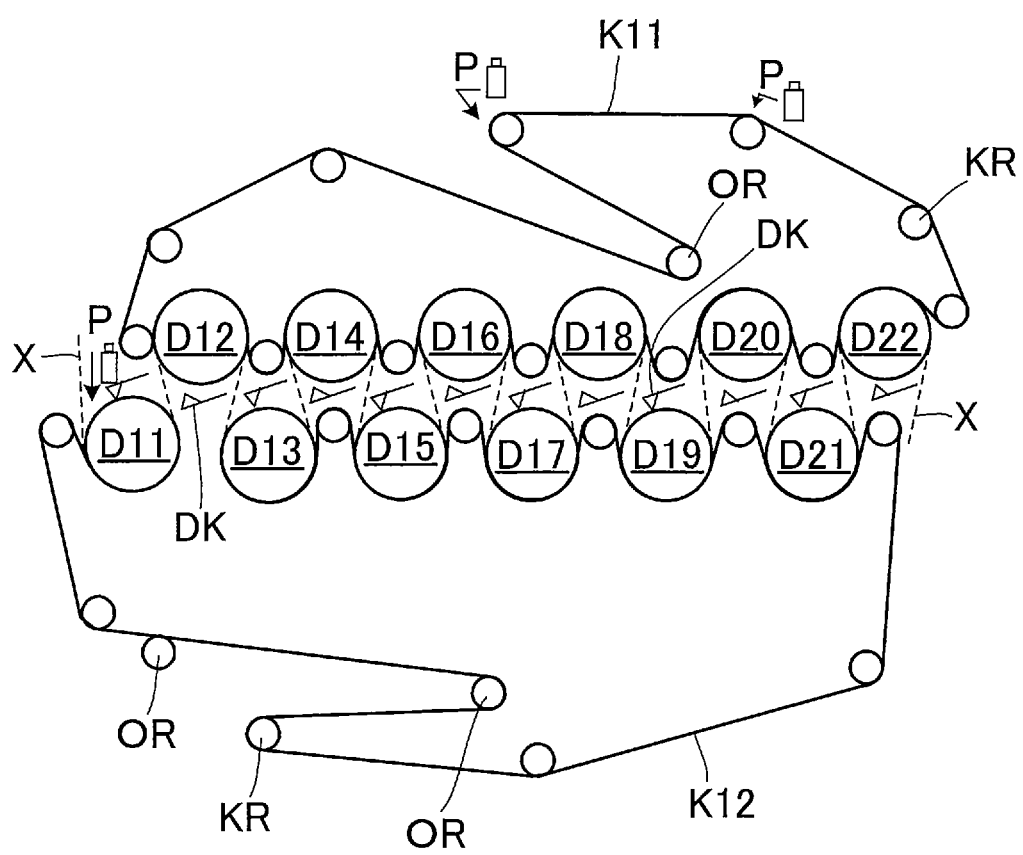
FIG. 7 is a schematic view showing a portion of a dry part of a paper-making machine in which a method for spraying a chemical solution according to a second embodiment is used.

FIG. 7 is a schematic view showing a portion of a dry part of a paper-making machine in which a method for spraying a chemical solution according to a second embodiment is used.

As shown in FIG. 7, the dry part of the paper-making machine includes: twelve cylindrical dryer rollers (Yankee dryers) D1, D12, D13, D14, D15, D16, D17, D18. D19, D20, D21, and D22 (hereinafter referred to as "D11 to D22") configured to move while heating and drying wet paper X; doctors DK configured to be in contact with the dryer rollers D11 to D22, respectively; upper and lower canvases K11 and K12 configured to move while pressing the wet paper X against surfaces of the dryer rollers D11 to D22; canvas rollers KR configured to guide the canvases K11 and K12; and outer rollers OR configured to guide the canvases K11 and K12. That is, the dry part of the paper-making machine is the same as the dry part D according to the first embodiment, except for the number of dryer rollers D11 to D22, the number of doctors DK, and the number of canvases K11 and K12.

In the dry part, as in the dry part D according to the first embodiment, the moving bodies, namely the dryer rollers D1 to D22 and the canvases K11 and K12, are configured to move (rotate) at the same speed as the wet paper X.

Further, chemical solutions are sprayed onto the dryer roller D11 and the canvas K11 by nozzle devices in positions indicated by the arrows P in FIG. 7, respectively.

A method for continuously spraying a chemical solution onto the dryer roller D1 is the same as the method according to the first embodiment, and as such, is not described here.

Third Embodiment

Figure 8:
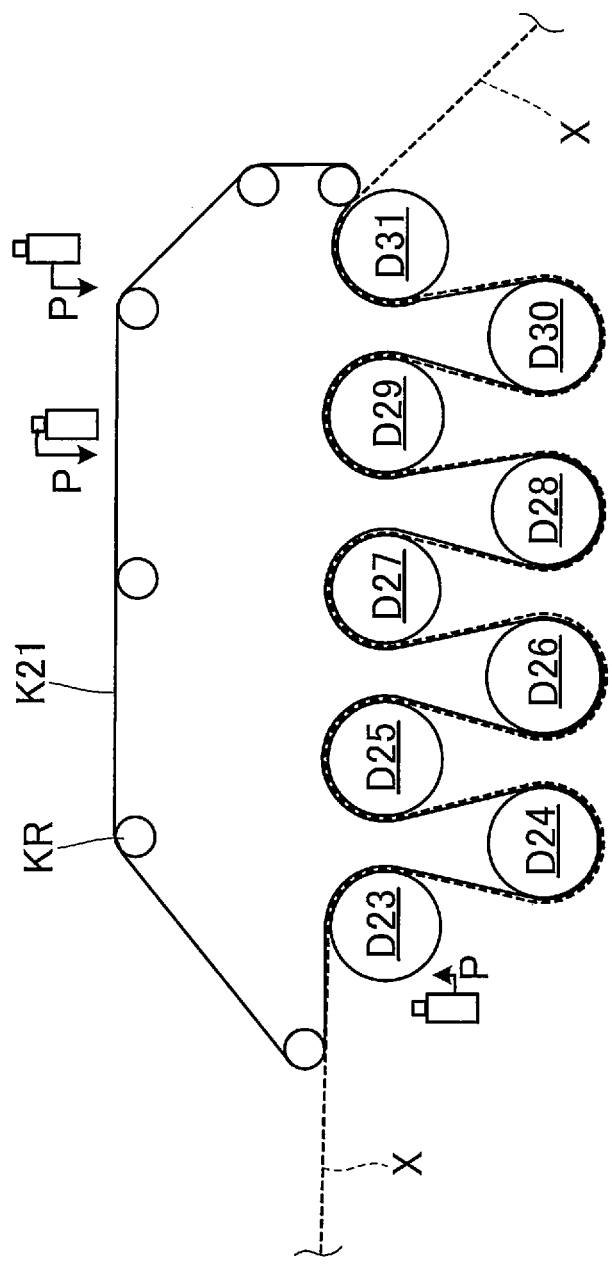
FIG. 8 is a schematic view showing a portion of a dry part of a paper-making machine in which a method for spraying a chemical solution according to a third embodiment is used.

FIG. 8 is a schematic view showing a portion of a dry part of a paper-making machine in which a method for spraying a chemical solution according to a third embodiment is used.

As shown in FIG. 8, the dry part of the paper-making machine includes: nine cylindrical dryer rollers (Yankee dryers) D23, D24, D25, D26, D27, D28, D29, D30, and D31 (hereinafter referred to as "D23 to D31") configured to move while heating and drying wet paper X; a canvas K21 configured to move while pressing the wet paper X against surfaces of the dryer rollers D23 to D31; and a canvas roller KR configured to guide the canvases K21. That is, the dry part of the paper-making machine is the same as the dry part D according to the first embodiment, except that no doctors DK are in contact with the dryer rollers D23 to D31 and that no outer roller is provided to guide the canvas K21.

In the dry part, as in the dry part D according to the first embodiment, the moving bodies, namely the dryer rollers D23 to D31 and the canvas K21, are configured to move (rotate) at the same speed as the wet paper X.

Further, chemical solutions are sprayed onto the dryer roller D23 and the canvas K21 by nozzle devices in positions indicated by the arrows P in FIG. 8, respectively.

Next, a method for continuously spraying a chemical solution onto the canvas K21 is described.

In the method for spraying a chemical solution, as in the dry part D according to the first embodiment, a chemical solution is sprayed onto the canvas K21 by using a nozzle device S (see FIG. 4).

Note here that a travel distance H that the nozzle device S travels during a single rotation of the canvas K21 and a width W of an area onto which the chemical solution is sprayed by the nozzle device S satisfy the relationship represented by the following expression:

$0.5 \leq H/W \leq 20.$

When the relationship represented by the above expression is satisfied, continuous spraying of the chemical solution makes it possible to apply the chemical solution onto the canvas K21 (moving body) without leaving a gap between sprayed areas, thus making it possible to surely form a uniform membrane on the moving body.

Further, in this range, it is preferable that the relationship $0.5 \leq H/W \leq 12$ be satisfied, more preferable that the relationship $0.5 \leq H/W \leq 9$ be satisfied, and even more preferable that the relationship $0.5 \leq H/W \leq 7$ be satisfied. In this case, the efficiency of application of the chemical solution is excellent. This makes it possible to form a more uniform membrane and surely prevent the occurrence of a partial cut in the membrane.

Note here that it is preferable that the width W of the sprayed area formed by the nozzle device fall within a range of 30 to 150 mm.

If the width W of the sprayed area is smaller than 30 mm, there are drawbacks of taking a longer time for the nozzle to reciprocate for reapplication and making the number of contacts with the wet paper larger than in a case where the width W of the sprayed area falls within the above range. On the other hand, if the width W of the sprayed area is larger than 150 mm, there is a drawback of making the efficiency of adhesion to the target lower due to scattering of a low-impact spray width end than in a case where the width W of the sprayed area falls within the above range.

Further, it is preferable that the travel distance H that the nozzle device travels fall within a range of 15 to 1800 mm, more preferably within a range of 15 to 1350 mm.

If the travel distance H is shorter than 15 mm, there are drawbacks of taking a longer time for the nozzle to reciprocate for reapplication and making the number of contacts with the wet paper larger than in a case where the travel distance H falls within the above range. On the other hand, if the travel distance H is longer than 1800 mm, there is a drawback of making the efficiency of adhesion to the target lower due to scattering of a low-impact spray width end than in a case where the travel distance H falls within the above range.

Preferred embodiments of the present invention have been described above. However, the present invention is not limited to these embodiments.

For example, although, in each of the methods according to the first to third embodiments, chemical solutions are sprayed by nozzle devices in positions indicated by the arrows P in FIG. 1, the present invention is not limited to these positions.

Although, in the method according to the first embodiment, a chemical solution is sprayed onto the dryer roller D1 by using a nozzle device S, the chemical solution may alternatively be similarly sprayed onto another dryer roller.

Further, although a chemical solution is sprayed onto the canvas K1 by using a nozzle device S, the chemical solution may alternatively be similarly sprayed onto another canvas.

The same applies to each of the methods according to the second and third embodiments.

In the method according to the first embodiment, chemical solutions can be similarly continuously sprayed onto the breaker stack rollers B and the calender rollers C, as well as the dryer roller D1 and the canvas K1.

The same applies to each of the methods according to the second and third embodiments.

Incidentally, when the target onto which a chemical solution is sprayed by the method according to the first embodiment is the dryer roller D1 or the canvas K, which takes a long time to revolve, the number of contacts with the wet paper during reciprocation is adequate and there is hardly a cut in the membrane.

Although, in each of the methods according to the first to third embodiments, a chemical solution is sprayed by a single nozzle device S, the chemical solution may alternatively be sprayed by a plurality of nozzle devices S.

EXAMPLES

The present invention is described in more detail below by way of examples. However, the present invention is not limited to these examples.

Examples 1 to 34 and Comparative Examples 1 to 10

The paper-making machine shown in FIG. 1 was brought into operation so that wet paper having a paper width of 2.5 m moved at a paper-making speed of 140 m/min. A nozzle device S was used as shown in FIG. 4 to apply an anti-soiling agent (Clean Keeper PBS 1291, concentration of 10%, viscosity of 1.5 cps (at 25° C.)) onto the canvas K1, which was guided by the canvas outer roller, at 5 cc/min under the conditions shown in Table 1.

Further, similarly, a nozzle device S was used as shown in FIG. 2 to apply an anti-soiling agent (DusClean PBM 3466 L, concentration of 10%, viscosity of 3.0 cps (at 25° C.)) onto the dryer roller D1 at 3 cc/min under the conditions shown in Table 2.

[Method for Evaluation]
(1) In Examples 1 to 17 and Comparative Examples 1 to 5, the paper-making machine was kept in operation for fourteen consecutive days. Soiling having accumulated on the surface of the canvas K1 was photographed at a fixed point. The percentage of soiling (pitch) on 10 cm$^2$ of the canvas was calculated by image analysis for a comparative evaluation. The results thus obtained are shown in Table 1.
(2) In Examples 18 to 34 and Comparative Examples 6 to 10, the paper-making machine was kept in operation for three consecutive days. Soiling having accumulated on the blade edge and blade back of a doctor brought into contact with the dryer roller D1 was collected, and the weight of the soiling was measured. The results thus obtained are shown in Table 2.

TABLE 1

|  | Travel distance H (mm) | Width W of sprayed area (mm) | H/W | Percentage of soiling |
|---|---|---|---|---|
| Example 1 | 40 | 80 | 0.5 | 5% |
| Example 2 | 64 | 80 | 0.8 | 2% |
| Example 3 | 80 | 80 | 1.0 | 0% |
| Example 4 | 120 | 80 | 1.5 | 0% |
| Example 5 | 160 | 80 | 2.0 | 0% |
| Example 6 | 200 | 80 | 2.5 | 0% |
| Example 7 | 240 | 80 | 3.0 | 0% |
| Example 8 | 320 | 80 | 4.0 | 0% |
| Example 9 | 480 | 80 | 6.0 | 0% |
| Example 10 | 640 | 80 | 8.0 | 1% |
| Example 11 | 800 | 80 | 10.0 | 1% |
| Example 12 | 960 | 80 | 12.0 | 3% |
| Example 13 | 1040 | 80 | 13.0 | 7% |
| Example 14 | 1120 | 80 | 14.0 | 7% |
| Example 15 | 1280 | 80 | 16.0 | 8% |
| Example 16 | 1440 | 80 | 18.0 | 8% |
| Example 17 | 1600 | 80 | 20.0 | 8% |
| Comparative Example 1 | 16 | 80 | 0.2 | 48% |
| Comparative Example 2 | 24 | 80 | 0.3 | 35% |

TABLE 1-continued

|  | Travel distance H (mm) | Width W of sprayed area (mm) | H/W | Percentage of soiling |
|---|---|---|---|---|
| Comparative Example 3 | 32 | 80 | 0.4 | 20% |
| Comparative Example 4 | 1760 | 80 | 22.0 | 26% |
| Comparative Example 5 | 1920 | 80 | 24.0 | 37% |

TABLE 2

|  | Travel distance H (mm) | Width W of sprayed area (mm) | H/W | Amount of soiling (g) |
|---|---|---|---|---|
| Example 18 | 15 | 30 | 0.5 | 2.0 |
| Example 19 | 24 | 30 | 0.8 | 1.6 |
| Example 20 | 30 | 30 | 1.0 | 1.1 |
| Example 21 | 45 | 30 | 1.5 | 0.9 |
| Example 22 | 60 | 30 | 2.0 | 1.0 |
| Example 23 | 75 | 30 | 2.5 | 1.5 |
| Example 24 | 90 | 30 | 3.0 | 2.0 |
| Example 25 | 105 | 30 | 3.5 | 3.1 |
| Example 26 | 120 | 30 | 4.0 | 3.2 |
| Example 27 | 180 | 30 | 6.0 | 3.3 |
| Example 28 | 240 | 30 | 8.0 | 3.4 |
| Example 29 | 300 | 30 | 10.0 | 3.5 |
| Example 30 | 360 | 30 | 12.0 | 3.6 |
| Example 31 | 420 | 30 | 14.0 | 3.7 |
| Example 32 | 480 | 30 | 16.0 | 3.8 |
| Example 33 | 540 | 30 | 18.0 | 3.9 |
| Example 34 | 600 | 30 | 20.0 | 4.1 |
| Comparative Example 6 | 6 | 30 | 0.2 | 14.1 |
| Comparative Example 7 | 9 | 30 | 0.3 | 11.3 |
| Comparative Example 8 | 12 | 30 | 0.4 | 8.4 |
| Comparative Example 9 | 660 | 30 | 22.0 | 8.2 |
| Comparative Example 10 | 720 | 30 | 24.0 | 10.4 |

It was found, from the results shown in Table 1, that the percentage of soiling on the canvas K1 is extremely small in a case where H/W falls within a range of 0.5 to 20.

Further, it was found, from the results shown in Table 2, that the amount of soiling on the dryer roller D1 is extremely small in a case where H/W falls within a range of 0.5 to 20.

Examples 35 to 45 and Comparative Examples 11 and 12

The paper-making machine shown in FIG. 1 was brought into operation so that wet paper having a paper width of 4.75 m moved at a paper-making speed of 680 m/min. Two nozzle device S arranged parallel to each other were used to simultaneously apply an anti-soiling agent (Clean Keeper PBS 2020, concentration of 10%, viscosity of 2.1 cps (at 25° C.)) onto the canvas K1 (canvas length of 35 m), which was guided by the canvas outer roller, at a total of 7 cc/min under the conditions shown in Table 3.

[Method for Evaluation]
In Examples 35 to 45 and Comparative Examples 11 and 12, the paper-making machine was kept in operation for three consecutive days. The weight of soiling having accumulated on the surface of the canvas K1 was converted into the weight of soiling per day for a comparative evaluation. The results thus obtained are shown in Table 3.

The soiling on the surface of the canvas was removed by rubbing a canvas doctor against the surface of the canvas immediately after passage of three days and collected with a save-all pan. Further, the width W of the sprayed area was equivalent to the widths of the two nozzle devices, and the amount of application was equivalent to the amounts of application by the two nozzle devices.

TABLE 3

| | Travel distance H (mm) | Width W of sprayed area (mm) | H/W | Amount of soiling (kg) |
|---|---|---|---|---|
| Example 35 | 75 | 150 | 0.5 | 9.06 |
| Example 36 | 120 | 150 | 0.8 | 6.42 |
| Example 37 | 150 | 150 | 1.0 | 1.67 |
| Example 38 | 450 | 150 | 3.0 | 1.53 |
| Example 39 | 750 | 150 | 5.0 | 1.05 |
| Example 40 | 1050 | 150 | 7.0 | 1.43 |
| Example 41 | 1350 | 150 | 9.0 | 2.54 |
| Example 42 | 1650 | 150 | 11.0 | 3.33 |
| Example 43 | 1800 | 150 | 12.0 | 3.45 |
| Example 44 | 1950 | 150 | 13.0 | 15.34 |
| Example 45 | 2100 | 150 | 14.0 | 18.55 |
| Comparative Example 11 | 45 | 150 | 0.3 | 35.56 |
| Comparative Example 12 | 60 | 150 | 0.4 | 20.50 |

It was found, from the results shown in Table 3, that the amount of soiling is extremely small in a case where H/W falls within a range of 1.0 to 12.

Examples 46 to 57 and Comparative Examples 13 and 14

The paper-making machine shown in FIG. 8 was brought into operation so that wet paper having a paper width of 5.0 m moved at a paper-making speed of 680 m/min. Two nozzle device S arranged parallel to each other were used to simultaneously apply an anti-soiling agent (Clean Keeper PBS 3184, concentration of 10%, viscosity of 2.0 cps (at 25° C.)) onto the canvas K21 (canvas length of 40 m), which was not guided by a canvas outer roller, at a total of 5 cc/min under the conditions shown in Table 4.
[Method for Evaluation]
In Examples 46 to 57 and Comparative Examples 13 and 14, the paper-making machine was kept in operation for five consecutive days. Soiling having accumulated on the surface of the canvas K21 was photographed at a fixed point. The percentage of soiling (pitch) on 10 cm$^2$ of the canvas was calculated by image analysis for a comparative evaluation. The results thus obtained are shown in Table 4.
Note that the width W of the sprayed area was equivalent to the widths of the two nozzle devices, and the amount of application was equivalent to the amounts of application by the two nozzle devices.

TABLE 4

| | Travel distance H (mm) | Width W of sprayed area (mm) | H/W | Percentage of soiling |
|---|---|---|---|---|
| Example 46 | 75 | 150 | 0.5 | 0% |
| Example 47 | 120 | 150 | 0.8 | 0% |
| Example 48 | 150 | 150 | 1.0 | 0% |
| Example 49 | 300 | 150 | 2.0 | 0% |
| Example 50 | 450 | 150 | 3.0 | 0% |
| Example 51 | 750 | 150 | 5.0 | 0% |
| Example 52 | 1050 | 150 | 7.0 | 0% |
| Example 53 | 1350 | 150 | 9.0 | 1% |
| Example 54 | 1650 | 150 | 11.0 | 1% |
| Example 55 | 1800 | 150 | 12.0 | 3% |
| Example 56 | 1950 | 150 | 13.0 | 15% |
| Example 57 | 2100 | 150 | 14.0 | 18% |
| Comparative Example 13 | 45 | 150 | 0.3 | 45% |
| Comparative Example 14 | 60 | 150 | 0.4 | 22% |

It was found, from the results shown in Table 4, that the amount of soiling is extremely small in a case where H/W falls within a range of 0.5 to 12.

Examples 58 to 66 and Comparative Examples 15 and 16

The paper-making machine shown in FIG. 7 was brought into operation so that wet paper having a paper width of 5.0 m moved at a paper-making speed of 680 m/min. A nozzle device S was used as shown in FIG. 2 to apply an anti-soiling agent (DusClean CMS 8163 L, concentration of 12%, viscosity of 1.6 cps (at 25° C.)) onto the dryer roller D11 at 5 cc/min under the conditions shown in Table 5.
[Method for Evaluation]
In Examples 58 to 66 and Comparative Examples 15 and 16, the paper-making machine was kept in operation for three consecutive days. Soiling having accumulated on the blade edge and blade back of a doctor brought into contact with the dryer roller D11 was collected, and the weight of the soiling was converted into the weight of soiling per day for a comparative evaluation. The results thus obtained are shown in Table 5.

TABLE 5

| | Travel distance H (mm) | Width W of sprayed area (mm) | H/W | Amount of soiling (g) |
|---|---|---|---|---|
| Example 58 | 15 | 30 | 0.5 | 12.10 |
| Example 59 | 24 | 30 | 0.8 | 10.44 |
| Example 60 | 30 | 30 | 1.0 | 9.01 |
| Example 61 | 45 | 30 | 1.5 | 11.12 |
| Example 62 | 60 | 30 | 2.0 | 10.34 |
| Example 63 | 75 | 30 | 2.5 | 14.42 |
| Example 64 | 90 | 30 | 3.0 | 15.31 |
| Example 65 | 120 | 30 | 4.0 | 45.33 |
| Example 66 | 150 | 30 | 5.0 | 46.39 |
| Comparative Example 15 | 12 | 30 | 0.4 | 63.52 |
| Comparative Example 16 | 9 | 30 | 0.3 | 83.50 |

It was found, from the results shown in Table 5, that the amount of soiling is extremely small in a case where H/W falls within a range of 0.5 to 3.0.

Examples 67 to 87 and Comparative Examples 17 to 22

The paper-making machine shown in FIG. 1 was brought into operation so that wet paper having a paper width of 4.5 m moved at varying paper-making speeds. A nozzle device S was used as shown in FIG. 2 to apply an anti-soiling agent (DusClean CMS 8163 L, concentration of 120%, viscosity of 1.6 cps (at 25° C.)) onto the dryer roller D1 at 5 cc/min under the conditions shown in Table 6.

[Method for Evaluation]

In Examples 67 to 87 and Comparative Examples 17 to 22, the paper-making machine was kept in operation for one consecutive hour. Soiling having accumulated on the blade edge and blade back of a doctor brought into contact with the dryer roller D1 was collected, and the weight of the soiling was subjected to a comparative evaluation. The results thus obtained are shown in Table 6.

TABLE 6

| | Paper-making speed (m/min) | Travel distance H (mm) | A1/H | Width W of sprayed area (mm) | H/W | Amount of soiling (g) |
|---|---|---|---|---|---|---|
| Example 67 | 340 | 15 | 300 | 30 | 0.5 | 7.33 |
| Example 68 | 340 | 24 | 187.5 | 30 | 0.8 | 5.50 |
| Example 69 | 340 | 30 | 150 | 30 | 1.0 | 4.40 |
| Example 70 | 340 | 60 | 75 | 30 | 2.0 | 2.21 |
| Example 71 | 340 | 90 | 50 | 30 | 3.0 | 3.45 |
| Example 72 | 680 | 15 | 300 | 30 | 0.5 | 9.62 |
| Example 73 | 680 | 24 | 187.5 | 30 | 0.8 | 8.23 |
| Example 74 | 680 | 30 | 150 | 30 | 1.0 | 5.82 |
| Example 75 | 680 | 60 | 75 | 30 | 2.0 | 4.33 |
| Example 76 | 680 | 90 | 50 | 30 | 3.0 | 5.54 |
| Example 77 | 695 | 30 | 150 | 30 | 1.0 | 8.60 |
| Example 78 | 695 | 60 | 75 | 30 | 2.0 | 5.53 |
| Example 79 | 695 | 90 | 50 | 30 | 3.0 | 7.34 |
| Example 80 | 340 | 120 | 37.5 | 30 | 4.0 | 15.53 |
| Example 81 | 340 | 150 | 30 | 30 | 5.0 | 23.52 |
| Example 82 | 680 | 120 | 37.5 | 30 | 4.0 | 16.82 |
| Example 83 | 680 | 150 | 30 | 30 | 5.0 | 28.32 |
| Example 84 | 695 | 15 | 300 | 30 | 0.5 | 10.76 |
| Example 85 | 695 | 24 | 187.5 | 30 | 0.8 | 9.53 |
| Example 86 | 695 | 120 | 37.5 | 30 | 4.0 | 23.66 |
| Example 87 | 695 | 150 | 30 | 30 | 5.0 | 36.54 |
| Comparative Example 17 | 340 | 9 | 500 | 30 | 0.3 | 55.62 |
| Comparative Example 18 | 340 | 15 | 375 | 30 | 0.4 | 67.67 |
| Comparative Example 19 | 680 | 9 | 500 | 30 | 0.3 | 73.21 |
| Comparative Example 20 | 680 | 12 | 375 | 30 | 0.4 | 86.42 |
| Comparative Example 21 | 695 | 9 | 500 | 30 | 0.3 | 86.75 |
| Comparative Example 22 | 695 | 12 | 375 | 30 | 0.4 | 92.98 |

It was found, from the results shown in Table 6, that the amount of soiling is extremely small in a case where H/W falls within a range of 0.5 to 3.0 and the full width A1 of the wet paper and the travel distance H that the nozzle device travels during a single rotation of the dryer roller satisfy A1/H≤300.

Examples 88 to 105

The paper-making machine shown in FIG. 1 was brought into operation so that wet paper having a paper width of 4.8 m moved at a paper-making speed of 700 m/min. A nozzle device S was used as shown in FIG. 4 to apply a silicone emulsion product (X-52-8247B (manufactured by Shin-Etsu Chemical Co., Ltd.), concentration of 50%, viscosity of 730 cps (at 25° C.)) onto the canvas K1, which was guided by the canvas outer roller, under the conditions shown in Table 7. The width of a sprayed area was 150 mm, and H/W was equal to 1.

Further, similarly, a nozzle device S was used as shown in FIG. 2 to apply a silicone emulsion product (X-52-8247B (manufactured by Shin-Etsu Chemical Co., Ltd.), concentration of 50%, viscosity of 730 cps (at 25° C.)) onto the dryer roller D1 under the conditions shown in Table 8. The width of a sprayed area was 30 mm, and H/W was equal to 1.

[Method for Evaluation]

(1) In Examples 88 to 96, the paper-making machine was kept in operation for five consecutive days. Soiling having accumulated on the surface of the canvas K1 was photographed at a fixed point. The percentage of soiling (pitch) on 10 cm² of the canvas was calculated by image analysis for a comparative evaluation.

Further, the rate of nozzle clogging after passage of five days was calculated by photographing and image analysis.

The results thus obtained are shown in Table 7.

(2) In Examples 97 to 106, the paper-making machine was kept in operation for five consecutive days. Soiling having accumulated on the blade edge and blade back of a doctor brought into contact with the dryer roller D1 was collected, and the weight of the soiling was measured.

Further, the rate of nozzle clogging after passage of five days was calculated by photographing and image analysis.

The results thus obtained are shown in Table 8.

TABLE 7

| | Viscosity (cps) at normal temperature (25° C.) | Dilute strength (times) | Remaining component (wt %) | Amount of application (cc/min) | Rate of nozzle clogging (%) | Percentage of soiling (%) |
|---|---|---|---|---|---|---|
| Example 88 | 730 | 1.00 | 50.0 | 1.00 | 70 | 55 |
| Example 89 | 700 | 1.01 | 49.5 | 1.01 | 65 | 43 |
| Example 90 | 600 | 1.03 | 48.5 | 1.03 | 60 | 5 |
| Example 91 | 500 | 1.06 | 47.2 | 1.06 | 20 | 3 |
| Example 92 | 300 | 1.16 | 43.1 | 1.16 | 15 | 2 |
| Example 93 | 200 | 1.24 | 40.3 | 1.24 | 5 | 0 |
| Example 94 | 100 | 1.43 | 35.0 | 1.43 | 5 | 0 |
| Example 95 | 50 | 1.69 | 29.6 | 1.69 | 5 | 0 |
| Example 96 | 3 | 6.00 | 8.3 | 6.00 | 0 | 0 |

TABLE 8

|  | Viscosity (cps) at normal temperature (25° C.) | Dilute strength (times) | Remaining component (wt %) | Amount of application (cc/min) | Rate of nozzle clogging (%) | Amount of soiling (g) |
| --- | --- | --- | --- | --- | --- | --- |
| Example 97 | 730 | 1.00 | 50.0 | 1.00 | 65 | 30.2 |
| Example 98 | 700 | 1.01 | 49.5 | 1.01 | 60 | 26.2 |
| Example 99 | 600 | 1.03 | 48.5 | 1.03 | 55 | 20.5 |
| Example 100 | 500 | 1.06 | 47.2 | 1.06 | 20 | 9.8 |
| Example 102 | 300 | 1.16 | 43.1 | 1.16 | 15 | 8.9 |
| Example 103 | 200 | 1.24 | 40.3 | 1.24 | 5 | 4.7 |
| Example 104 | 100 | 1.43 | 35.0 | 1.43 | 5 | 4.5 |
| Example 105 | 50 | 1.69 | 29.6 | 1.69 | 5 | 3.5 |
| Example 106 | 3 | 6.00 | 8.3 | 6.00 | 0 | 3.3 |

It was found, from the results shown in FIG. 7, that the rate of nozzle clogging due to scattering of the chemical solution and the soiling on the canvas K1 are extremely small in a case where the viscosity of the chemical solution is 500 cps or lower at normal temperature (25° C.).

Further, it was found, from the results shown in FIG. 8, that the rate of nozzle clogging due to scattering of the chemical solution and the soiling on the dryer roller D11 are extremely small in a case where the viscosity of the chemical solution is 500 cps or lower at normal temperature (25° C.).

As is evident from the results shown in the examples, the methods for spraying a chemical solution according to the present embodiments can sufficiently suppress contamination on a dryer roller and a canvas as compared with the methods for spraying a chemical solution of the comparative examples. From this, it was confirmed that in the case of a canvas that is guided by a dryer roller with which a doctor is in contact or by an outer roller, bringing H/W into a range of 0.5 to 20 makes it possible to uniformly apply a chemical solution onto the moving body and suppress adhesion of soiling such as paper powder or pitch.

INDUSTRIAL APPLICABILITY

A method for spraying a chemical solution according to the present invention can be suitably used as a method for continuously spraying a chemical solution onto a moving body of a dry part of a paper-making machine. The present invention makes it possible to uniformly apply a chemical solution onto a moving body and exhibits excellent spraying efficiency.

REFERENCE SIGNS LIST

B Breaker stack roller
C Calender roller
D Dry part
DK Doctor
D1, D2, D3, D4, D5, D6, D7, D8, D9, D11, D12, D13, D14, D15, D16, D17, D18, D19, D20, D21, D22, D23, D24, D25. D26, D27, D28, D29, D30, D31 Dryer roller
H Travel distance
KR Canvas roller
K1, K11, K12, K21 Canvas
OR Outer roller
S Nozzle device
W Width of sprayed area
X Wet paper

The invention claimed is:

1. A method for spraying a chemical solution in which, in a dry part of a paper-making machine, a chemical solution is continuously sprayed onto a moving body that guides wet paper, while a nozzle device is reciprocatingly traveling in directions orthogonal to a moving direction of the moving body with the moving body in motion, wherein:
   the moving body is a cylindrical dryer roller or an endless canvas;
   a fixed width W of a sprayed area that is formed on the moving body by the nozzle device in a case where the nozzle device does not move falls within a range of 30 to 150 mm;
   a relative travel distance H that the nozzle device moves in a width direction of the moving body during a single rotation of the moving body falls within a range of 15 to 1800 mm;
   a full width A1 of the wet paper falls with a range of 3000 to 9000 mm; and
   the travel distance H and the width W satisfy the relationship represented by the following expression:

$0.5 \leq H/W \leq 20$.

* * * * *